US008622299B2

(12) United States Patent
Crooks et al.

(10) Patent No.: US 8,622,299 B2
(45) Date of Patent: Jan. 7, 2014

(54) APPARATUS, METHOD AND SYSTEM FOR DETERMINING THE SOURCE OF AN OPTICAL CODE PRESENTATED TO AN OPTICAL CODE SCANNER

(75) Inventors: John Crooks, Duluth, GA (US); Timothy Edward Mason, Buford, GA (US); Michael A. Kleppinger, Buford, GA (US)

(73) Assignee: NCR Corporation, Duluth, GA (US)

( * ) Notice: Subject to any disclaimer, the term of this patent is extended or adjusted under 35 U.S.C. 154(b) by 83 days.

(21) Appl. No.: 13/308,168

(22) Filed: Nov. 30, 2011

(65) Prior Publication Data

US 2013/0134217 A1     May 30, 2013

(51) Int. Cl.
G06K 7/10     (2006.01)
G06K 7/00     (2006.01)

(52) U.S. Cl.
USPC ...... 235/454; 235/435; 235/439; 235/462.01; 235/472.01

(58) Field of Classification Search
USPC ............... 235/440, 472.01, 435, 439, 462.01, 235/462.06
See application file for complete search history.

(56) References Cited

U.S. PATENT DOCUMENTS 6,223,988 B1 * 5/2001 Batterman et al. ....... 235/472.01
2002/0070278 A1 * 6/2002 Hung et al. .............. 235/472.01

* cited by examiner

*Primary Examiner* — Steven S Paik
*Assistant Examiner* — Claude J Brown
(74) *Attorney, Agent, or Firm* — Harden E. Stevens, III (57) ABSTRACT

A device, method and system is provided for determining if an optical code is presented to an optical code scanner in either a printed form or on the display of an electronic device. Certain presentation characteristics of an optical code are different depending on whether the optical code is presented in printed form or on the display of an electronic device. The changes in the presentation characteristics require changes to certain parameters of the optical code scanner for the optical code to be read.

20 Claims, 5 Drawing Sheets

APPARATUS, METHOD AND SYSTEM FOR DETERMINING THE SOURCE OF AN OPTICAL CODE PRESENTATED TO AN OPTICAL CODE SCANNER

FIELD OF THE INVENTION

The present invention relates generally to an optical code scanner. More particularly, but not exclusively, the invention relates to determining whether an optical code being read by an optical code scanner is being presented in a printed form or being displayed on a portable display device.

BACKGROUND

Any discussion of prior art throughout the specification should in no way be considered as an admission that such prior art is widely known or forms part of common general knowledge in the field.

Point of sale (POS) terminals are used throughout the retail industry to process purchase transactions. A POS terminal typically includes a personal computer (PC) core in a chassis, one or more displays, an optical code scanner with weigh scale, a cash drawer, a magnetic stripe reader (MSR), keyboard and a printer. The POS terminals can either be self-service or assisted service.

The optical code scanner includes an imaging scanner and may also include a laser scanner. The two scanners use different technologies to independently read optical codes such as barcodes presented to the scanner. The laser scanner reads a barcode by sweeping a beam of laser light across a barcode, capturing data representing the reflected laser light, and then processing the captured data to recover information encoded in the barcode. An imaging scanner reads a barcode by capturing a complete image of the barcode and then processing the image to recover information encoded in the barcode.

Optical codes, such as barcodes, are generally affixed to or printed on items being presented to a POS terminal for purchase or identification. The optical codes include information about the item they are affixed to or printed on. Some retailers have experienced a type of fraud where a customer presents a barcode for a lesser priced item to a POS terminal for scanning however they place a more expensive item on a security weigh scale of the POS terminal. The customer is charged for the lesser item but receives the more expensive item. For the fraud to be successful, the weight of the two items must be the same or relatively close to each other. So the customer does not have to actually present the lesser priced item for scanning, the customer presents the barcode for the lesser priced item to the POS terminal on the display of an electronic device, such as a smart phone.

Therefore, to prevent the above fraud, as well as other related frauds, there is a need to determine if an optical code that is being presented to a POS terminal is in a printed form on an item or being displayed on the display of an electronic device.

SUMMARY OF THE INVENTION

It is an object of the present invention to overcome or ameliorate at least one of the disadvantages of the prior art, or to provide a useful alternative.

Among its several aspects, one embodiment of the present invention recognizes the need to identify the presentation method used to present an optical code to an optical code scanner which includes an imaging scanner. The presentation methods include printed and displayed on an electronic device. One aspect of the present invention determines the presentation method of the optical code by analyzing the settings of a plurality of adjustable parameters of the imaging scanner after the optical code is successfully read. Different settings optimize the imaging scanner to read optical codes presented in one of the presentation methods. Determining which settings caused the optical code to be read, determines which presentation method was used to present the optical code for reading.

In another embodiment, the optical code scanner is a hybrid optical code scanner and includes the imaging scanner and a laser scanner.

In accordance with an embodiment of the present invention, there is provided an optical code scanner for reading an optical code and determining the optical code is presented in printed form or displayed on an electronic device. The optical code scanner comprising: an imaging scanner where the imaging scanner reads the optical code by capturing an image of the optical code and where the imaging scanner includes a plurality of adjustable parameters that affect the ability to successfully read the optical code; and where the optical code scanner determines the optical code is presented in printed form by determining that the setting of one of the plurality of adjustable parameters matches a first predetermined setting for the one adjustable parameter and determines the optical code is presented by displaying the optical code on the electronic device by determining that the setting of the one of the plurality of adjustable parameters matches a second predetermined setting for the one adjustable parameter.

A more complete understanding of the present invention, as well as further features and advantages of the invention, will be apparent from the following Detailed Description and the accompanying Drawings.

BRIEF DESCRIPTION OF THE DRAWINGS

The aspects of the claimed invention can be better understood with reference to the Drawings and the Detailed Description. The Drawings are not necessarily drawn to scale. Throughout the Drawings, like element numbers are used to describe the same parts throughout the various drawing, figures and charts.

DETAILED DESCRIPTION

In the following description, numerous details are set forth to provide an understanding of the claimed invention. However, it will be understood by those skilled in the art that the claimed invention may be practiced without these details and that numerous variations or modifications from the described embodiments are possible.

The term optical code, as used herein, includes both one and two dimensional barcodes. In addition, two dimensional barcodes include Quick Response (QR) codes and data matrix codes. The term optical code is not intended to be limited to just these examples but include machine readable codes that provide unique information or identification.

Figure 1:
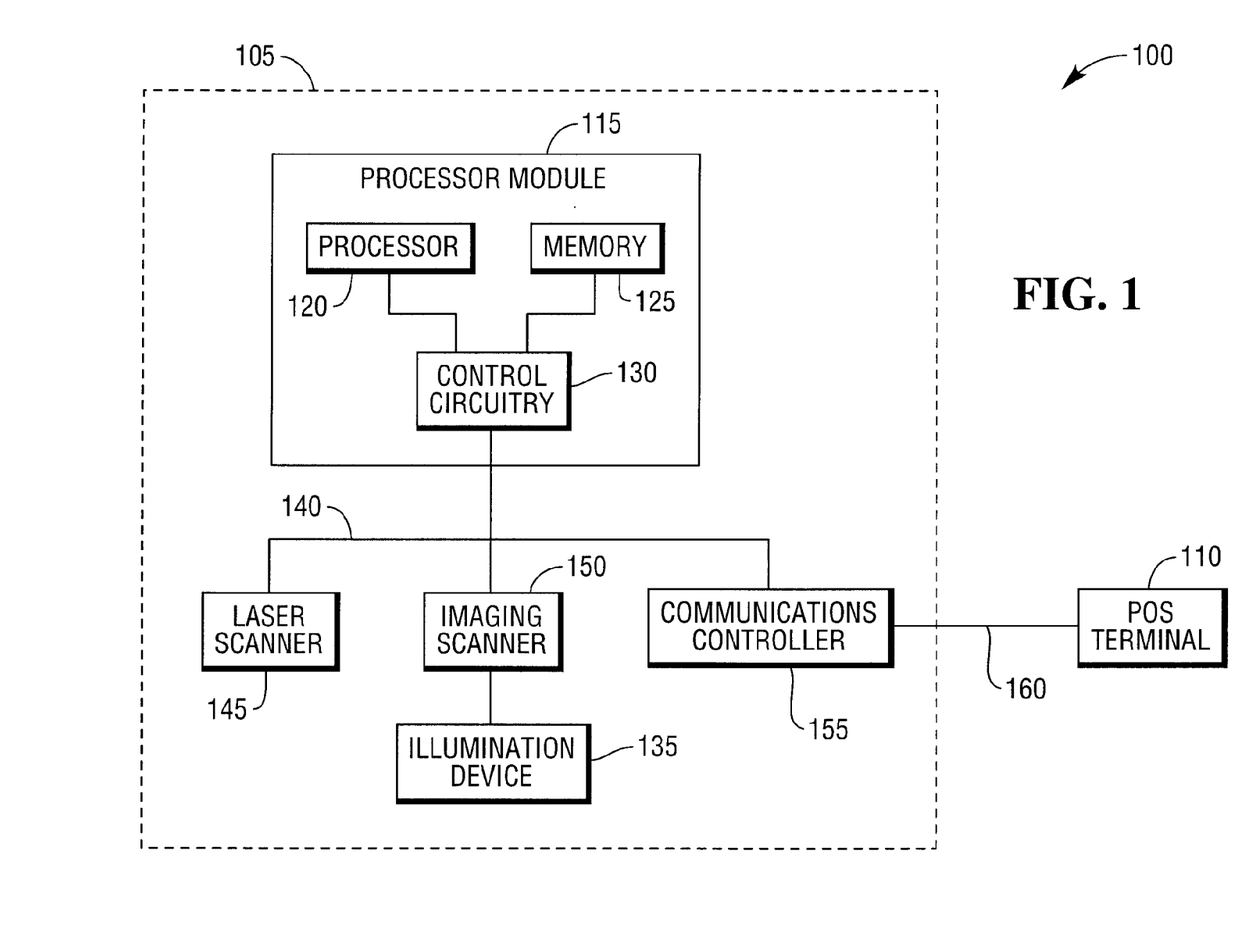
FIG. 1 is a high-level block diagram illustrating an exemplar embodiment of a point-of-sale system.

Referring now to FIG. 1, there is provided a high-level block diagram illustrating an exemplar embodiment of a point of sale (POS) system 100. The POS system 100 can be either an assisted or self-checkout system. The POS system 100 includes a hybrid optical code scanner ("hybrid scanner") 105 connected over a data connection 160 to a POS terminal 110. The hybrid optical code scanner 105 includes a processor module 115, a laser scanner 145, an imaging scanner 150, an illumination device 135 and a communications controller 155.

Within the processor module 115, there is included a processor 120, a memory 125 and control circuitry 130. The memory 125 includes both volatile and non-volatile memory. Software stored in the memory 125 is executed by the processor 120 and causes the processor 125 to control the devices and operation of the hybrid optical code scanner 105. The control circuitry 130 provides an interface between the processor 120 and the memory 125 and between the processor 120 a data bus 140 used to communicate with other devices that comprise the hybrid optical code scanner 105 including but not limited to the laser scanner 145, imaging scanner 150 and communications controller 155. In some embodiments, all or a portion of the memory 125 is connected directly to the processor 120.

The communications controller 155 includes hardware and software required to communicate with external devices over the data connection 160. In some embodiments, the data connection 160 is implemented using an industry standard USB bus to connect the hybrid optical code scanner 105 to the POS terminal 110.

Figure 2:
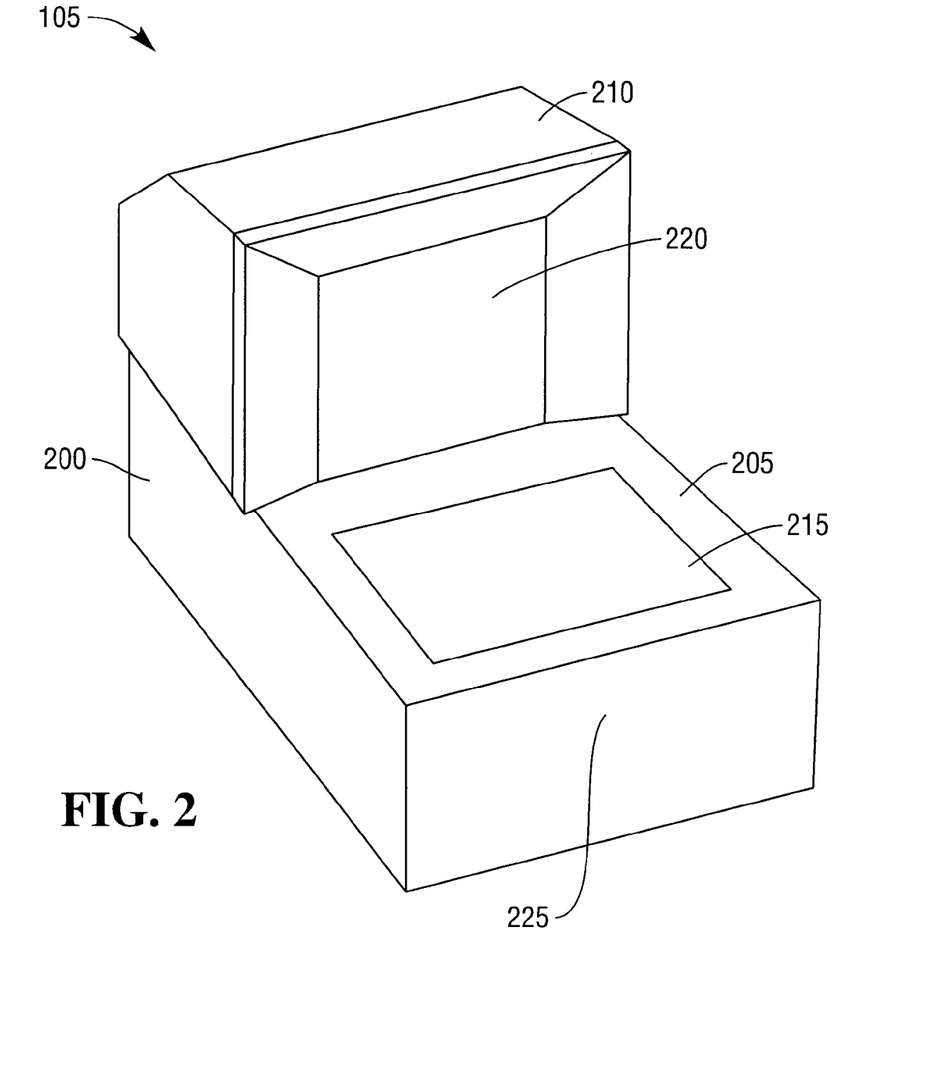
FIG. 2 is a high-level drawing illustrating an exemplar embodiment of a hybrid optical code scanner.

Turning to FIG. 2, there is provided a high-level drawing illustrating an exemplar embodiment of the hybrid optical code scanner 105. The hybrid optical code scanner 105 includes a housing 200 comprising a vertical housing component 210 and horizontal housing component 205. The vertical housing component 210 includes a vertical scanning window 220 and the horizontal housing component 205 includes a horizontal scanning window 215. The vertical scanning window 220 faces the front 225 of the hybrid optical code scanner 105. An operator/user of the hybrid optical code scanner 105 stands in front 225 of the hybrid optical code scanner 105 facing the vertical scanning window 220 and moves optical codes (FIG. 3, 300) for scanning through a first volume of space (FIG. 3, 370) generally above the horizontal scanning window 215 and in front of the vertical scanning window 220. The optical code 300 can be printed or fixed on an item or displayed on the display of an electronic device.

Figure 3:
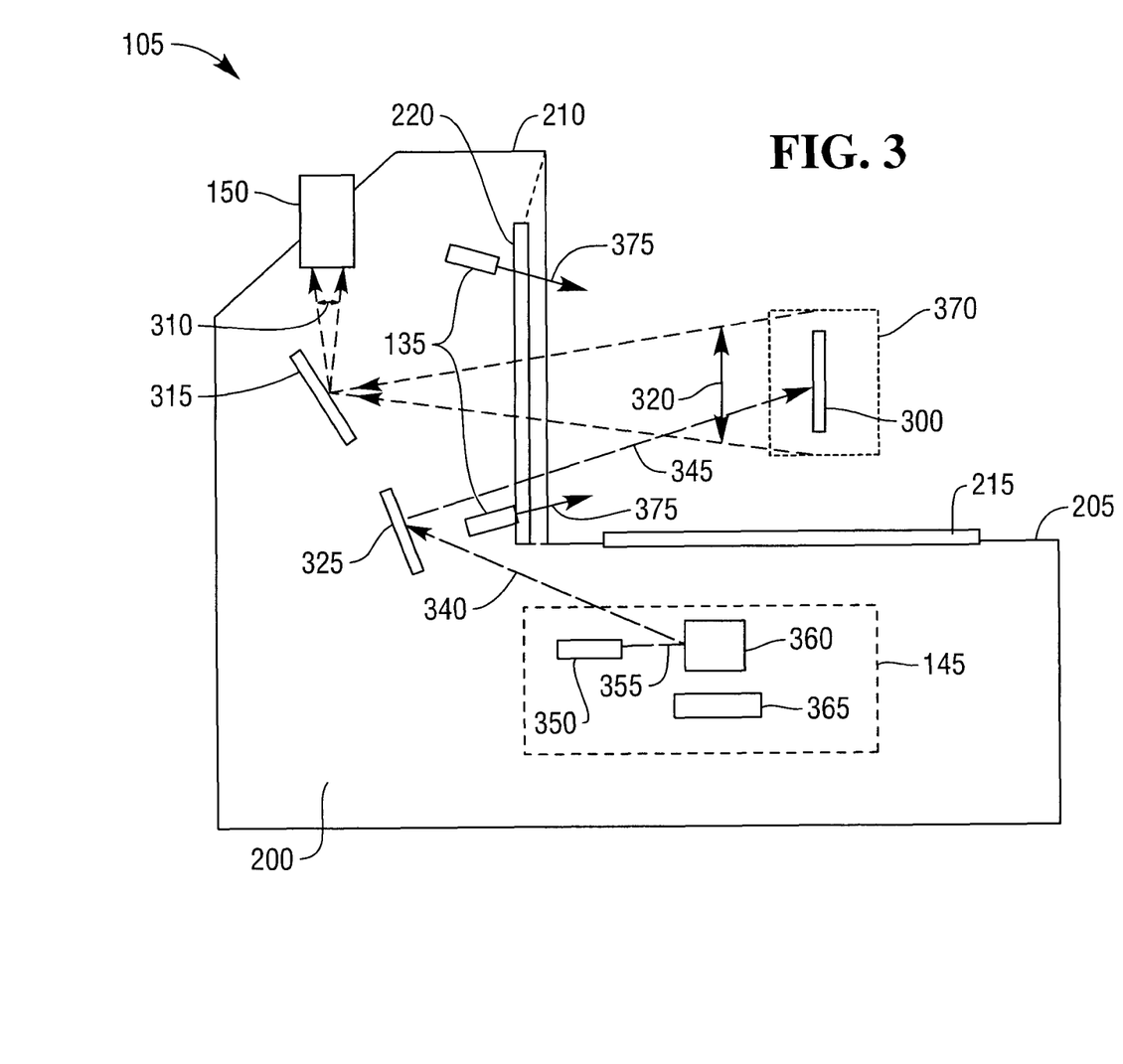
FIG. 3 is a high-level cross-sectional drawing further illustrating the exemplar embodiment of the hybrid optical code scanner.

With reference to FIG. 3, there is provided a high-level cross-sectional drawing further illustrating the exemplar embodiment of the hybrid optical code scanner 105.

The laser scanner 145 includes a laser generation device 350, a laser beam directing device 360 for directing a laser beam 355 generated by the laser generation device 350 and a photo-detector 365 for detecting laser light reflected from an optical code back to the laser scanner 145. The laser scanner 145 additionally includes a pattern mirror 325 used to direct a laser beam 340 reflected by the laser beam directing device 360.

The pattern mirror 325 is one of a plurality of pattern mirrors (not shown). The pattern mirror 325 receives the laser beam 340 from the laser beam directing device 360 and reflects a laser beam 345 through the vertical scanning window 220 to an area in front of the vertical scanning window 220 and generally over the horizontal scanning window 215.

In some embodiments, the area the laser beam 345 is directed to may extend beyond the area directly above the horizontal scanning window 215. The laser beam directing device 360 causes the laser beam 345 to move so that it scans the volume of space 370. As the laser beam 345 strikes and moves across an optical code 300, the reflected laser light is directed back to the laser scanner 145 (optics not shown) where the laser light is captured by the photo-detector 365. The processor 120 processes the captured data and reads the information encoded in the optical code 300. The laser scanner 145 additionally generates laser beams that are directed through the horizontal scanning window 215 to read optical codes oriented downward. Laser scanners, in general, are best suited to read one dimensional (1D) barcodes (which are included as an optical code).

During the reading of the optical code 300 by the laser scanner 145, the processor 120 determines a signal to noise ratio of the reflected laser light. A high signal to noise ratio means the optical code 300 has clear, high contrast symbols making it likely that the laser scanner 145 will read the optical code 300 on the first try. A low signal to noise ratio means the optical code 300 is not clear and has low contrast symbols making difficult for the laser scanner 145 to read the optical code 300 even when multiple attempts are made.

The imaging scanner 150 is shown as part of the vertical housing component 210. In some embodiments, the imaging scanner 150 is removable from the vertical housing component 210 and is operated as a hand held device to read optical codes not presented directly to the hybrid scanner 105. However, when the imaging scanner 150 is docked in the vertical housing component 210 it reads optical codes as depicted in this figure. In other embodiments, the imaging scanner 150 is positioned in different locations within the hybrid scanner 105 and maybe fixed or removable.

The imaging scanner 150 includes an image capture device such as a CMOS image sensor. When the optical code 300 is presented to the hybrid optical code scanner 105, the optical code 300 is illuminated by one or more illumination devices 135. Each illumination device 135 generates light directed toward 375 the scan volume 370 to illuminate a optical code within the scan volume 370. The intensity of the light generated by the illumination device 135 is controlled by the processor 120. Each illumination device 135 can be turned off or to full intensity or to numerous intensities in between off and full intensity. The reflected image travels along a first path 320 to a mirror 315 where the image is directed along a second path 310 to the imaging scanner 150. The processor 120 commands the imaging scanner 150 to capture an image of the optical code 300 and then the processor 120 receives and processes the captured image to recover information encoded in the optical code 300.

The imaging scanner 150 has number of other parameters also controlled by the processor 120. These parameters include shutter open or exposure time and aperture setting. The shutter of the imaging scanner 150 can be implemented as either a mechanical or electronic shutter. The aperture setting controls the amount of light transmitted to the imaging scanner 150.

If the processor 120 fails to recover optical code information from a captured image, it will adjust one or more of the imaging scanner's 150 parameters, including the illumination intensity, and repeat the process of capturing and processing a captured image until the optical code is read. When the optical code is successfully read, each of the parameter settings is known or can be read by the processor 120.

The hybrid scanner 105 uses a number of different methods to determine whether an optical code 300 is being presented in printed form or electronic form from an electronic device. Some methods rely just on the imaging scanner 150 and others use both the imaging scanner 150 and the laser scanner 145.

For example, when the imaging scanner 150 is reading a printed optical code 300, the highest first time reads are achieved when the illumination intensity from the illumination device 135 is near to or at a maximum level. Whereas, optical codes 300 presented on the display of an electronic device are best read by the imaging scanner 150 when the illumination intensity from the illumination device 135 is zero or near zero. If the imaging scanner 150 fails to read an optical code 300 when the illumination intensity is at or near to a maximum level but is able to read the optical code 300 when the illumination intensity is zero or near zero, the optical code 300 is being displayed on an electronic device. If the imaging scanner 150 fails to read an optical code 300 when the illumination intensity is zero or near zero but is able to read the optical code 300 when the illumination intensity is at or near a maximum intensity, the optical code 300 is being presented in a printed form.

In addition to the illumination intensity setting, the shutter time and aperture setting of the imaging scanner 150 also are used to indicate which form the optical code 300 is presented in. Optical codes 300 presented to the imaging scanner 150 on an electronic device are best read using short shutter times and larger aperture openings. Whereas, optical codes 300 presented in printed form are best read using longer shutter times and smaller aperture openings.

In some embodiments, one or more of the three parameters (intensity, shutter time, and aperture openings) may remain fixed while the others are changed until the optical code 300 is successfully read. Therefore, the processor 120 can determine whether an optical code 300 is presented in printed form or on an electronic device by determining the settings for each parameter of the imaging scanner 150 that caused the optical code 300 to be successfully read.

In general, the laser scanner 145 has great difficultly reading an optical code 300 being displayed on an electronic device. Even when the laser scanner 145 is able to read an optical code 300 being displayed on an electronic device, the signal to noise ratio is very low. Conversely, the imaging scanner 150 is usually able to read optical codes 300 being displayed on an electronic device. Therefore, the processor 120 can determine whether an optical code 300 is presented in printed form or on an electronic device by determining if the optical code 300 was read by the imaging scanner 150 and not by the laser scanner 145. When the laser scanner 145 is able to read the optical code 300, a very low signal to noise ratio indicates that the optical code 300 is being displayed on an electronic device.

The imaging scanner 150 captures an image of the optical code which is processed to read the optical code. The image usually includes additional information about the area around the optical code. This additional information can be processed by the processor 120 to determine if the optical code is being displayed on an electronic device such as a cell phone or if the optical code is printed on a product or a coupon. By processing this additional information, the processor 120 can determine if the optical code is being presented in printed form or on an electronic device.

Figure 4:
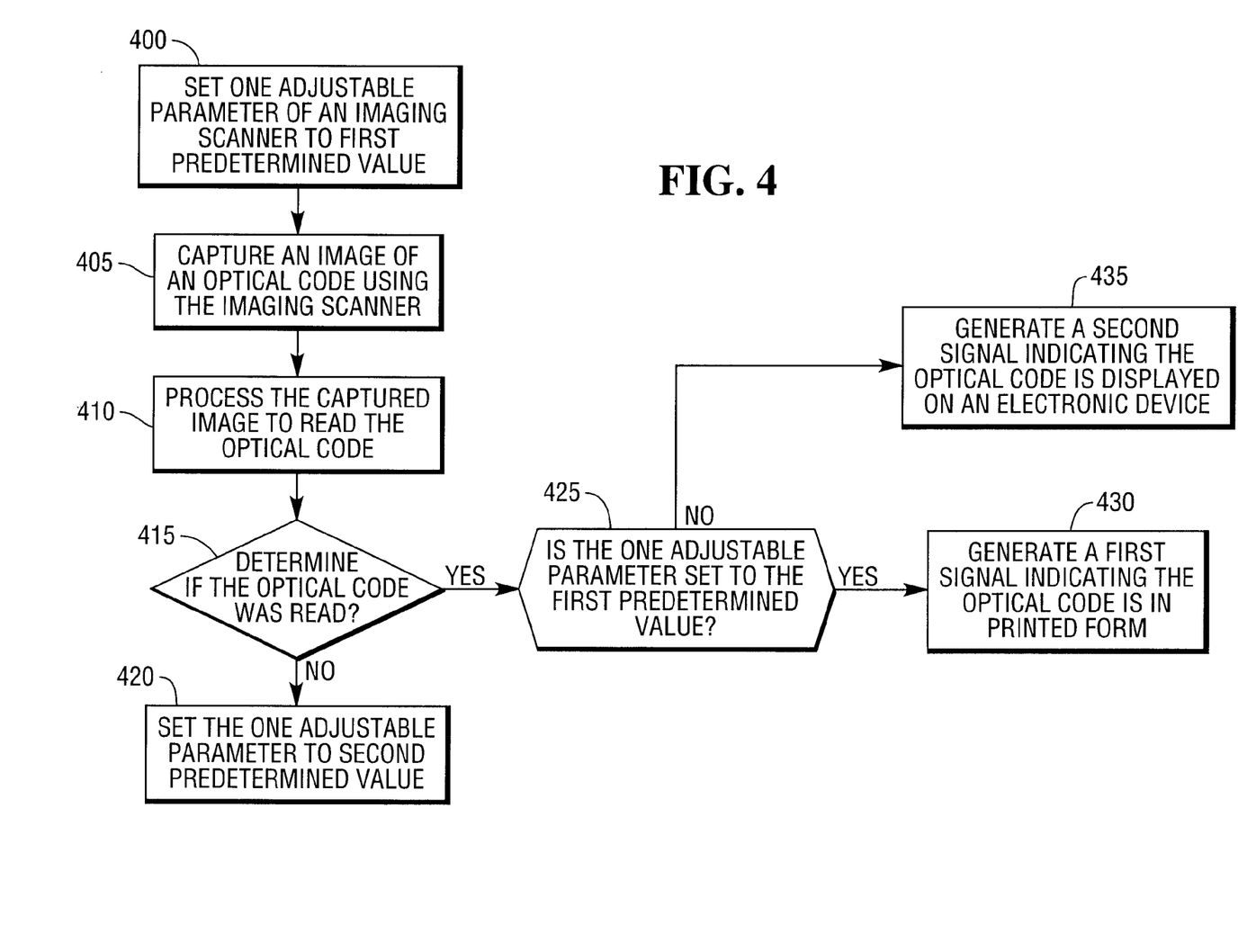
FIG. 4 is a high-level flow chart illustrating an exemplar method of determining the source of an optical code presented to an imaging scanner.

Turning to FIG. 4, there is provided a high-level flow chart illustrating an exemplar method of determining the source of an optical code presented to an imaging scanner 150 that is part of an optical code scanner 105. Certain methods that determine the form in which an optical code is being presented to an optical code scanner require that the optical code scanner include both a laser and imaging scanner. Other methods will determine the form in which an optical code is being presented using just an imaging scanner 150. The method depicted in FIG. 4 only requires an imaging scanner 150 to be present. However, the presence of a laser scanner 145 does not diminish the effectiveness of the method.

In step 400, one adjustable parameter of the imaging scanner 150 is set to a first predetermined value associated with the one adjustable parameter. The imaging scanner 150 includes a plurality of adjustable parameters and the one adjustable parameter is one of the plurality of adjustable parameters. The plurality of adjustable parameters control how the imaging scanner 150 reads an optical code and includes parameters that control illumination of the optical code, shutter time and aperture size.

In step 405, the imaging scanner 150 captures an image of an optical code 300 being presented to imaging scanner 150 for reading. In step 410, the captured image is processed to read the optical code 300. In some cases, the optical code 300 cannot be read from the captured image. A failure to read a properly presented optical code 300 is usually due to one or more of the adjustable parameters being set to a setting that is not optimized for the method of presentation being used to present the optical code 300.

In step 415, if the optical code 300 was read, control is transferred to step 425. If the optical code 300 was not read, control passes to step 420 where the one adjustable parameter is set to a second predetermined value associated with the one adjustable parameter and control is transferred to step 405.

Each of the plurality of adjustable parameter has an associated first and second predetermined value. Each first predetermined value when applied to its associated adjustable parameter causes the imaging scanner 150 to be optimally configured to read optical codes that are presented in printed form. Each second predetermined value, when applied to its associated adjustable parameter, causes the imaging scanner 150 to be optimally configured to read optical codes that are presented from a display of an electronic device.

In step 425, it is determined if the one of the plurality of adjustable parameters is set to its first predetermined value associated with the one adjustable parameter and if it is, control is transferred to step 430. Otherwise, control is transferred to step 435. In step 430, a first signal is generated that indicates the optical code was presented in printed form to the imaging scanner 150. This signal can then be further processed to determine is a fraudulent action has occurred.

If control is transferred to step 435, it is assumed that the one of the plurality of adjustable parameter is set to the second predetermined value associated with the one adjustable parameter. In step 435, a second signal is generated that indicates the optical code 300 was presented on a display of an electronic device to the imaging scanner 150. This signal can then be further processed to determine is a fraudulent action has occurred. For example, it is appropriate to scan optical codes from the display of an electronic device when the optical codes represent coupons or loyalty cards. However, it is not appropriate to scan an optical code for a product for purchase from the display of an electronic device. This action would indicate a possible fraudulent transaction.

Figure 5:
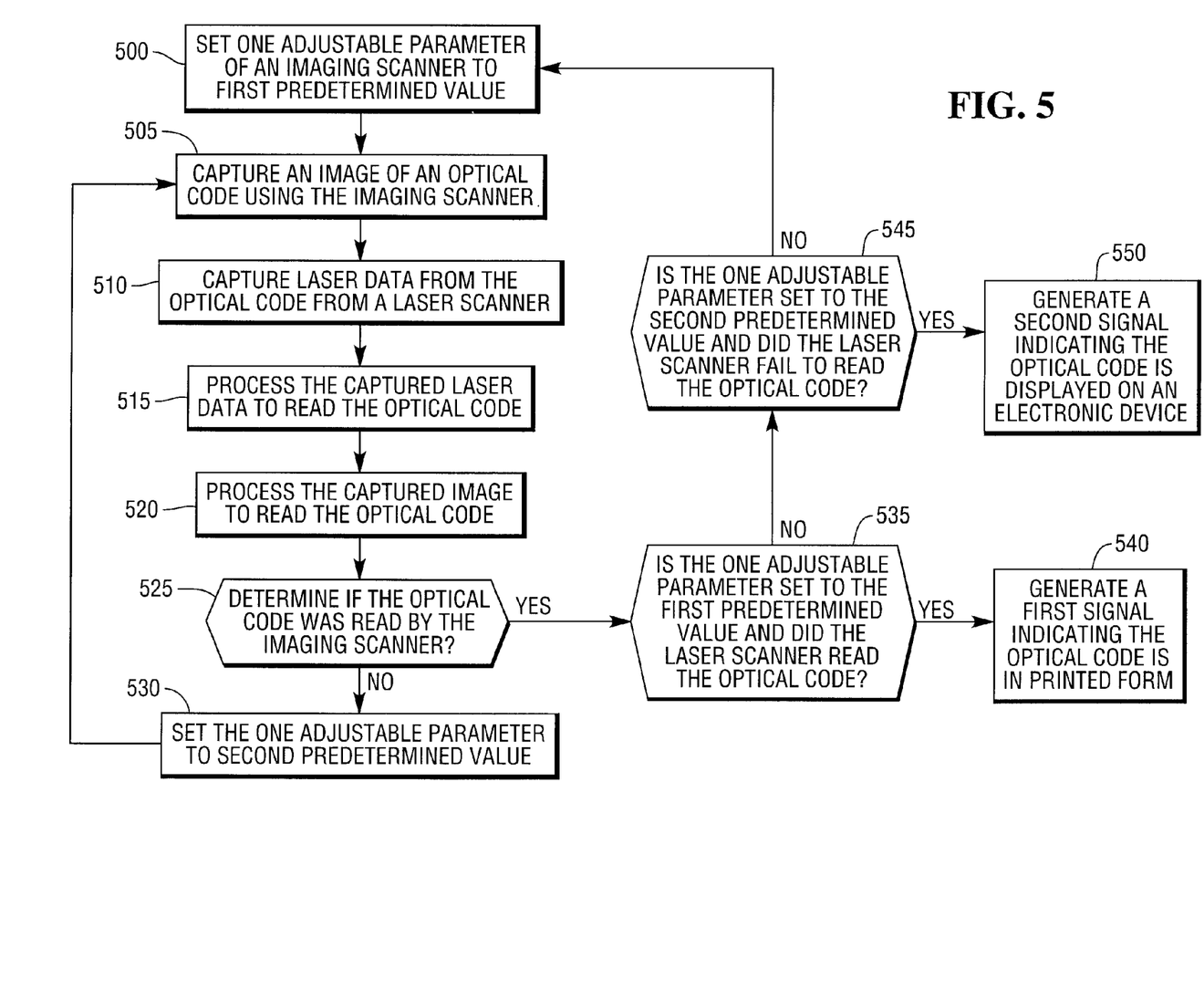
FIG. 5 is a high-level flow chart illustrating an exemplar method of determining the source of an optical code presented to a hybrid optical code scanner.

FIG. 5 depicts a high-level flow chart illustrating an exemplar method of determining the source of an optical code presented to a hybrid optical code scanner 105. In this embodiment, both an imaging scanner 150 and a laser scanner 145 are used to determine if an optical code 300 is being presented in printed form or on the display of an electronic device. The operation of the imaging scanner 150 in FIG. 5 is the same as described in the FIG. 4.

In step 500, one adjustable parameter of the plurality of adjustable parameters is set to a first predetermined value associated with the one adjustable parameter. In step 505, the imaging scanner 150 captures an image of an optical code 300 being presented to the imaging scanner 150 for reading.

In step 510, the laser scanner 145 captures laser data from the optical code 300. The laser scanner 145 generates laser scan lines that sweep through the scan volume 370. Laser light reflected from a scanned optical code 300 is directed back to the laser scanner 145 and captured. In step 515, the captured laser data is processed to read the optical code 300. An optical code cannot always be read by processing the captured laser data. As discussed above, it is very difficult for a laser scanner 145 to read an optical code 300 presented from a display of an electronic device.

In step 520, the captured image from the imaging scanner 150 is processed to read the optical code 300. In some cases, the optical code 300 cannot be read from the captured image. A failure to read a properly presented optical code 300 is usually due to one or more of the adjustable parameters being set to a setting that is not optimized for the method of presentation being used to present the optical code 300.

In step 525, if the optical code 300 was read by the imaging scanner 150, control is transferred to step 535. If the optical code 300 was not read by the imaging scanner 150, control passes to step 530 where the one adjustable parameter is set to a second predetermined value associated with the one adjustable parameter and control is transferred to step 505.

In step 535, control is transferred to step 540 if the one adjustable parameter is set to the first predetermined value and the laser scanner 145 also read the optical code 300. Otherwise, control passes to step 545.

In step 540, a first signal is generated that indicates the optical code was presented in printed form to the hybrid optical code scanner 105.

In step 545, control is transferred to step 550 if the one adjustable parameter is set to the second predetermined value associated with the one adjustable parameter and the laser scanner 145 fails read the optical code 300. Otherwise, control is transferred to step 500.

In step 550, a second signal is generated that indicates the optical code 300 was presented on a display of an electronic device to the imaging scanner 150.

Although particular reference has been made to an embodiment that includes a hybrid optical code scanner and examples have been provided illustrating the invention in combination with a laser and imaging scanner, certain other embodiments, variations and modifications are also envisioned within the spirit and scope of the following claims. For example, there are embodiments where the invention is used in scanners having only an imaging scanner. In still other embodiments, after the optical code is read by the imaging scanner 150, the captured image of an optical code is further processed to identify the environment surrounding the optical code. In this embodiment, the further processing identifies either an electronic device or the product that the optical code identifies. This information is then used to determine the method of presentation for the optical code.

We claim:

1. An optical code scanner for reading an optical code and determining the optical code is presented in printed form or displayed on an electronic device, the optical code scanner comprising:
   an imaging scanner where the imaging scanner reads the optical code by capturing an image of the optical code and where the imaging scanner includes a plurality of adjustable parameters that affect the ability to successfully read the optical code; and
   where the optical code scanner determines the optical code is presented in printed form by determining that the setting of one of the plurality of adjustable parameters matches a first predetermined setting for the one adjustable parameter and determines the optical code is presented by displaying the optical code on the electronic device by determining that the setting of the one of the plurality of adjustable parameters matches a second predetermined setting for the one adjustable parameter.

2. The optical code scanner of claim 1, further including a laser scanner where the laser scanner generates at least one laser scan beam and reads the optical code presented to the optical code scanner by detecting laser light reflected from the optical code when it is scanned by the least one laser scan beam.

3. The optical code scanner of claim 2, where the optical code scanner further determines the optical code is presented in printed form by determining that both the laser scanner and imaging scanner successfully read the optical code.

4. The optical code scanner of claim 2, where the optical code scanner further determines the optical code is presented by displaying the optical code on the electronic device by determining that the imaging scanner successfully reads the optical code and that the laser scanner is unsuccessful at reading the optical code.

5. The optical code scanner of claim 2, where the optical code scanner further determines the optical code is presented by displaying the optical code on the electronic device by determining that the optical code is read by both the imaging scanner and the laser scanner but the signal to noise ratio from the laser scanner is low.

6. The optical code scanner of claim 2, where the optical code scanner further determines the optical code is presented in printed form by determining that the optical code is read by both the imaging scanner and the laser scanner but the signal to noise ratio from the laser scanner is high.

7. The optical code scanner of claim 1, where the one of the plurality of adjustable parameters is an illumination level for the imaging scanner and the first predetermined setting represents a maximum illumination level and the second predetermined setting represents a minimum illumination level.

8. The optical code scanner of claim 1, where the one of the plurality of adjustable parameters is a shutter time for the imaging scanner and the first predetermined setting represents a shutter time that is longer than a shutter time for the second predetermined setting.

9. The optical code scanner of claim 1, where the one of the plurality of adjustable parameters is an aperture opening for the imaging scanner and the first predetermined setting represents a smaller aperture opening and the second predetermined setting represents a larger aperture opening.

10. A computer implemented method for use by an optical code scanner to determine the presentation source of an optical code being presented for reading by the optical code scanner, the method comprising:
   a) setting one of a plurality of adjustable parameters of an imaging scanner to a first predetermined value where the imaging scanner is a component of the optical code scanner;
   b) capturing an image of an optical code using the imaging scanner;
   c) processing the captured image to read the optical code if possible;

d) determining the optical code cannot be read and setting the one of the plurality of adjustable parameters to a second predetermined value and repeating steps b through c;

e) generating a first signal indicating the optical code was presented in a printed form when the optical code is read by processing the image data and the one of the plurality of adjustable parameters is set to the first predetermined value; and f) generating a second signal indicating the optical code was presented on a display of an electronic device when the optical code is read and the one of a plurality of adjustable parameters is set to the second predetermined value.

11. The method of claim 10, wherein the one of the plurality of adjustable parameters is an illumination parameter that controls the amount of light produced and directed at the optical code and wherein the first predetermined value causes the maximum illumination to be produced and wherein the second predetermined value causes the minimum illumination to be produced.

12. The method of claim 10, wherein the one of the plurality of adjustable parameters is an exposure parameter that controls the amount of time a shutter on the imaging scanner is open and wherein the first predetermined value causes the shutter time to be set to a minimum exposure time and wherein the second predetermined value causes the shutter time to be set to a maximum exposure time.

13. The method of claim 10, wherein the one of the plurality of adjustable parameters is an aperture parameter that controls the size of the aperture opening on the imaging scanner and wherein the first predetermined value causes the aperture to be set to a minimum opening and wherein the second predetermined value causes the aperture opening to be set to a maximum opening.

14. The method of claim 10, further comprising the steps:
   b.2) capturing laser data using a laser scanner where the laser data represents reflected laser light from the optical code; and
   b.3) processing the captured laser data to read the optical code if possible.

15. The method of claim 14, wherein step "e" further includes generating the first signal when the optical code is also read by processing the laser data.

16. The method of claim 14, wherein step "f" further includes generating the second signal when processing the laser data fails to read the optical code.

17. A point of sale system including:
   a point of sale terminal; and
   a hybrid optical code scanner for reading an optical code and determining the optical code is presented in printed form or displayed on an electronic device, the hybrid optical code scanner comprising:
      an imaging scanner where the imaging scanner reads the optical code by capturing an image of the optical code and where the imaging scanner includes a plurality of adjustable parameters that affect the ability to successfully read the optical code;
      a laser scanner where the laser scanner generates at least one laser scan beam and reads the optical code presented to the hybrid optical code scanner by detecting laser light reflected from the optical code when it is scanned by the least one laser scan beam; and
      where the hybrid optical code scanner determines the optical code is presented in printed form by determining that the setting of one of the plurality of adjustable parameters matches a first predetermined setting for the one adjustable parameter and determines the optical code is presented by displaying the optical code on the electronic device by determining that the setting of the one of the plurality of adjustable parameters matches a second predetermined setting for the one adjustable parameter.

18. The system of claim 17, where the one of the plurality of adjustable parameters is an illumination level for the imaging scanner and the first predetermined setting represents a maximum illumination level and the second predetermined setting represents a minimum illumination level.

19. The system of claim 17, where the one of the plurality of adjustable parameters is a shutter time for the imaging scanner and the first predetermined setting represents a shutter time that is longer than a shutter time for the second predetermined setting.

20. The system of claim 17, where the one of the plurality of adjustable parameters is an aperture opening for the imaging scanner and the first predetermined setting represents a smaller aperture opening and the second predetermined setting represents a larger aperture opening.

* * * * *